(12) United States Patent
Charles et al.

(10) Patent No.: US 8,922,559 B2
(45) Date of Patent: Dec. 30, 2014

(54) GRAPH CLUSTERING

(75) Inventors: Denis X. Charles, Bellevue, WA (US); David M Chickering, Bellevue, WA (US); Patrice Y Simard, Bellevue, WA (US); Reid M Andersen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 12/748,014

(22) Filed: Mar. 26, 2010

(65) Prior Publication Data

US 2011/0234594 A1    Sep. 29, 2011

(51) Int. Cl.
| | |
|---|---|
| G06T 11/20 | (2006.01) |
| G06Q 30/08 | (2012.01) |
| G06Q 30/02 | (2012.01) |
| G06F 17/30 | (2006.01) |
| G06K 9/62 | (2006.01) |

(52) U.S. Cl.
CPC .............. G06K 9/6224 (2013.01); G06Q 30/08 (2013.01); G06Q 30/02 (2013.01); G06F 17/30958 (2013.01)
USPC ........................................................ 345/440

(58) Field of Classification Search
None
See application file for complete search history.

(56) References Cited

U.S. PATENT DOCUMENTS

| | | | |
|---|---|---|---|
| 6,044,361 A | 3/2000 | Kalagnanam et al. | |
| 6,665,653 B1 | 12/2003 | Heckerman et al. | |
| 6,714,975 B1 | 3/2004 | Aggarwal et al. | |
| 6,990,459 B2 | 1/2006 | Schneider | |
| 7,039,931 B2 | 5/2006 | Whymark | |
| 7,546,249 B2 | 6/2009 | Main | |
| 7,627,878 B2 | 12/2009 | Pouliot et al. | |
| 7,738,984 B2 | 6/2010 | Denton et al. | |
| 8,001,004 B2 | 8/2011 | Protheroe et al. | |
| 8,082,549 B2 | 12/2011 | Corley, Jr. et al. | |
| 8,224,689 B1 | 7/2012 | Sandberg et al. | |
| 8,234,139 B2 | 7/2012 | Wan et al. | |
| 8,352,611 B2 | 1/2013 | Maddhuri et al. | |
| 2002/0049608 A1 | 4/2002 | Hartsell et al. | |
| 2002/0103688 A1 | 8/2002 | Schneider | |
| 2003/0035429 A1 | 2/2003 | Mitra et al. | |
| 2003/0154282 A1 | 8/2003 | Horvitz | |
| 2003/0225635 A1 | 12/2003 | Renz et al. | |
| 2003/0236745 A1 | 12/2003 | Hartsell et al. | |
| 2004/0010592 A1 | 1/2004 | Carver et al. | |

(Continued)

OTHER PUBLICATIONS

Buchbinder et al., "Online Primal-Dual Algorithms for Maximizing Ad-Auctions Revenue," Oct. 2007, Springer Berlin Heidelberg, vol. 4698, pp. 255-260.*

(Continued)

*Primary Examiner* — Daniel Hajnik
*Assistant Examiner* — Andrew G Yang
(74) *Attorney, Agent, or Firm* — Joann Dewey; Jim Ross; Micky Minhas

(57) ABSTRACT

Various embodiments provide techniques for graph clustering. In one or more embodiments, a participation graph is obtained that represents relationships between entities. An auxiliary graph is constructed based on the participation graph. The auxiliary graph may be constructed such that the auxiliary graph is less dense than the participation graph and is therefore computationally less complex to analyze. Clusters in the auxiliary graph are determined by solving an objective function defined for the auxiliary graph. Clusters determined for the auxiliary graph may then be utilized to ascertain clusters in the participation graph that solve a related objective function defined for the participation graph.

20 Claims, 6 Drawing Sheets

(56) References Cited

U.S. PATENT DOCUMENTS

| | | |
|---|---|---|
| 2004/0044571 A1 | 3/2004 | Bronnimann et al. |
| 2004/0257858 A1 | 12/2004 | Mansingh et al. |
| 2004/0267686 A1* | 12/2004 | Chayes et al. ............... 707/1 |
| 2005/0102398 A1 | 5/2005 | Zhang et al. |
| 2005/0144065 A1 | 6/2005 | Calabria et al. |
| 2005/0234935 A1 | 10/2005 | Barsness et al. |
| 2006/0049468 A1 | 3/2006 | Cheng et al. |
| 2006/0080171 A1 | 4/2006 | Jardins et al. |
| 2006/0089140 A1 | 4/2006 | Zhang |
| 2006/0253328 A1 | 11/2006 | Kohli et al. |
| 2007/0016473 A1 | 1/2007 | Anderson et al. |
| 2007/0016918 A1 | 1/2007 | Alcorn et al. |
| 2007/0027756 A1 | 2/2007 | Collins et al. |
| 2007/0083885 A1 | 4/2007 | Harding |
| 2007/0118432 A1 | 5/2007 | Vazirani et al. |
| 2007/0162882 A1 | 7/2007 | Ueda |
| 2007/0198350 A1* | 8/2007 | O'Kelley et al. ............. 705/14 |
| 2007/0214115 A1* | 9/2007 | Liu et al. ..................... 707/3 |
| 2007/0255690 A1 | 11/2007 | Chang et al. |
| 2007/0256095 A1 | 11/2007 | Collins |
| 2008/0004990 A1 | 1/2008 | Flake et al. |
| 2008/0010304 A1* | 1/2008 | Vempala et al. ............ 707/100 |
| 2008/0016217 A1 | 1/2008 | Astley et al. |
| 2008/0071603 A1 | 3/2008 | Denton et al. |
| 2008/0080396 A1 | 4/2008 | Meijer et al. |
| 2008/0134193 A1 | 6/2008 | Corley et al. |
| 2008/0255937 A1 | 10/2008 | Chang et al. |
| 2008/0256034 A1 | 10/2008 | Chang et al. |
| 2008/0275899 A1 | 11/2008 | Baluja et al. |
| 2008/0313089 A1 | 12/2008 | Du Preez |
| 2009/0037267 A1 | 2/2009 | Duggal et al. |
| 2009/0070177 A1 | 3/2009 | Agarwal et al. |
| 2009/0106184 A1 | 4/2009 | Lang et al. |
| 2009/0144168 A1 | 6/2009 | Grouf et al. |
| 2009/0248478 A1 | 10/2009 | Duggal et al. |
| 2009/0254420 A1 | 10/2009 | Curd et al. |
| 2009/0313120 A1 | 12/2009 | Ketchum |
| 2010/0042496 A1 | 2/2010 | Wang et al. |
| 2010/0082393 A1 | 4/2010 | Vassilvitskii et al. |
| 2010/0082412 A1 | 4/2010 | Brower et al. |
| 2010/0106332 A1 | 4/2010 | Chassin et al. |
| 2010/0106641 A1 | 4/2010 | Chassin et al. |
| 2010/0121694 A1 | 5/2010 | Bharadwaj et al. |
| 2010/0131592 A1 | 5/2010 | Zhang et al. |
| 2010/0175111 A1* | 7/2010 | Schreiber et al. .............. 726/4 |
| 2010/0191558 A1 | 7/2010 | Chickering et al. |
| 2010/0279600 A1 | 11/2010 | Noh et al. |
| 2010/0299215 A1 | 11/2010 | Feldman et al. |
| 2011/0106922 A1 | 5/2011 | Bouillet et al. |
| 2011/0126207 A1 | 5/2011 | Wipfel et al. |
| 2011/0145512 A1 | 6/2011 | Adl-Tabatabai et al. |
| 2011/0187717 A1* | 8/2011 | Jagannath et al. ............ 345/440 |
| 2011/0208559 A1* | 8/2011 | Fontoura et al. ............. 705/7.26 |
| 2011/0231215 A1 | 9/2011 | Santos et al. |
| 2011/0238490 A1 | 9/2011 | Simard |
| 2011/0246312 A1 | 10/2011 | Meek |
| 2011/0251889 A1 | 10/2011 | Simard |
| 2011/0258045 A1 | 10/2011 | Chickering |
| 2011/0320606 A1 | 12/2011 | Madduri et al. |
| 2012/0265884 A1 | 10/2012 | Zhang et al. |
| 2013/0013357 A1 | 1/2013 | Liu et al. |
| 2013/0046924 A1 | 2/2013 | Adl-Tabatabai et al. |
| 2013/0046925 A1 | 2/2013 | Adl-Tabatabai et al. |
| 2013/0117062 A1 | 5/2013 | Rangarajan |
| 2013/0117454 A1 | 5/2013 | Rangarajan |

OTHER PUBLICATIONS

Luxburg, "A tutorial on spectral clustering," Aug. 2007, Springer Science+Business Media, pp. 401 and 412.*
"Final Office Action", U.S. Appl. No. 12/751,533, (Oct. 25, 2012), 10 pages.
"Restriction Requirement", U.S. Appl. No. 13/288,650, (Dec. 10, 2012), 9 pages.
"Final Office Action", U.S. Appl. No. 12/732,031, (Jan. 30, 2013), 15 pages.
"Non-Final Office Action", U.S. Appl. No. 13/288,650, (Mar. 29, 2013), 17 pages.
"Non-Final Office Action", U.S. Appl. No. 13/348,465, Oct. 23, 2013, 15 pages.
"Final Office Action", U.S. Appl. No. 13/288,650, Sep. 30, 2013, 14 pages.
"Advisory Action", U.S. Appl. No. 13/288,650, Jan. 29, 2014, 7 pages.
Schwaighoger, et al., "Scalable Clustering and Keyword Suggestion for Online Advertisements", Retrieved at <<http://research.microsoft.com/pubs/81021/adClustering.pdf>>In the proceedings of ADKDD'09, Jun. 28, 2009, pp. 10.
Carrasco, et al., "Clustering of bipartite advertiser-keyword graph", Retrieved at <<http://www.soe.ucsc.edu/classes/ism293/Spring09/material/papers/lec6/clusteringBidTerms.pdf>>2003, pp. 8.
Graph Partitioning, Retrieved at <<http://research.yahoo.com/node/2368>>Retrieved Date: Jan. 20, 2010, p. 1.
Lang, et al., "Finding Dense and Isolated Submarkets in a Sponsored Search Graph", Retrieved at <<http://www.google.co.in/url?sa=t&source=web&ct=res&cd=3&ved=0CBMQFjAC&url=http%3A%2F2Fresearch.yahoo.com%2Ffiles%2Fcikm636-langk.pdf&rct32 j&q=%22Finding+dense+and+isolated+submarkets+in+a+sponsored+search+spending+graph+by+Kevin+J.+Lang+and+Reid+Andersen%22&ei=EUpVS7yGGKK60gTMzbSsCg&usg=AFQjCNEVxq-U8y2Xd5671VbK__fxLfq0WIA>> In the proceedings of the sixteenth ACM conference on information and knowledge management, Nov. 6-10, 2007, pp. 613-622.
"Display Inventory Allocation Optimization", Retrieved from: <http://labs.yahoo.com/event/60>on Jan. 21, 2010, 1 page.
"Final Office Action", U.S. Appl. No. 12/757,634, (Oct. 11, 2012), 14 pages.
"Final Office Action", U.S. Appl. No. 12/761,961, (Oct. 19, 2012), 14 pages.
"Non-Final Office Action", U.S. Appl. No. 12/761,961, (Jun. 19, 2012), 12 pages.
"Non-Final Office Action", U.S. Appl. No. 12/732,031, (Sep. 7, 2012), 14 pages.
"Non-Final Office Action", U.S. Appl. No. 12/751,533, (Aug. 28, 2012), 9 pages.
"Non-Final Office Action", U.S. Appl. No. 12/757,634, (Jun. 19, 2012), 11 pages.
"Restriction Requirement", U.S. Appl. No. 12/751,533, (Jun. 28, 2012), 10 pages.
Abrams, Zoe et al., "Optimal Delivery of Sponsored Search Advertisements Subject to Budget Constraints", *In EC '07: Proceedings of the 8th ACM conference on Electronic commerce*, pp. 272-278, New York, NY, USA, 2007. ACM., available at <http://citeseerx.ist.psu.edu/viewdoc/download?doi=10.1.1.138.7165&rep=rep1&type=pdf>,(2007), pp. 272-278.
Aggarwal, Gagan et al., "Truthful Auctions for Pricing Search Keywords", *EC 2006*, Available at <http://delivery.acm.org/10.1145/1140000/1134708/p1-aggarwal.pdf?key1=1134708&key2=3637314621&coll=GUIDE&dl=GUIDE&CFID=74229622&CFTOKEN=92771433>,(Jun. 2006), pp. 1-7.
Agrawal, Shipra et al., "A Dynamic Near-optimal Algorithm for Online Linear Programming", arXiv:0911.2974v1, 2009, available at <http://arxiv.org/PS_cache/arxiv/pdf/0911/0911.2974v1.pdf>,(2009), pp. 1-18.
Alaei, Saeed "Online Allocation of Display Advertisements Subject to Advanced Sales Contracts", *ADKDD 2009*, Available at <http://research.yahoo.com/files/23ADKDD09.pdf>,(Jun. 2009), 9 pages.
Anastasakos, Tasos et al., "A Collaborative Filtering Approach to Sponsored Search", Retrieved at <<http://research.yahoo.com/files/YL-2009-006-query-ad-click-graph.pdf>>, Yahoo!Labs Technical Report No. YL-2009-006, (Aug. 14, 2009), 24 pages.
Arora, Dushyant et al., "On the Benefit of Virtualization: Strategies for Flexible Server Allocation", *Proceedings: USENIX Workshop on Hot Topics in Management of Internet, Cloud, and Enterprise Networks and Services (Hot-ICE)*, (2011), 6 pages.
Arora, Sanjeev et al., "The Multiplicative Weights Update Method: A Meta Algorithm and Applications", *Technical report*, 2005, available at <http://citeseerx.ist.psu.edu/viewdoc/download?doi=10.1.1.80.1997&rep=rep1&type=pdf>,(2005), 31 pages.

(56) References Cited

OTHER PUBLICATIONS

Babaioff, Moshe et al., "Matroids, Secretary Problems, and Online Mechanisms", *Proceedings of the Eighteenth Annual ACM-SIAM Symposium on Discrete Algorithms*, Available at <http://www.cs.cornell.edu/~rdk/papers/matsec.pdf>,(2007), 10 pages.

Bahmani, Bahman et al., "Improved Bounds for Online Stochastic Matching", *ESA*, pp. 170-181, 2010, available at <http://www.stanford.edu/~kapralov/papers/stochastic-final.pdf>,(2010) pp. 170-181.

Balcan, Maria-Florina et al., "Mechanism Design via Machine Learning", *FOCS 2005*, Available at <http://www.cs.tau.ac.il/~mansour/papers/05-focs-aa.pdf>,(Oct. 2005), 10 pages.

Borgs, Christian et al., "Multi-Unit Auctions with Budget-Constrained Bidders", *Proceedings of the 6th ACM Conference on Electronic Commerce*, Available at <http://research.microsoft.com/en-us/um/people/borgs/Papers/budget.pdf>,(2005), pp. 1-11.

Buchbinder, Niv "Online Primal-Dual Algorithms for Maximizing Ad-Auctions Revenue", *ESA 2007*, Abstract, Available at <http://www.springerlink.com/content/52n2011t207301r5/fulltext.pdf?page=1>,(2007), 1 page.

Buchbinder, Niv et al., "Online Primal-dual Algorithms for Maximizing Ad-auctions Revenue", *In ESA'07: Proceedings of the 15th annual European conference on Algorithms*, pp. 253-264, Berlin, Heidelberg, 2007. *Springer-Verlag*, available at <http://www.math.tu-berlin.de/coga/teaching/wt07/online/pdf/ad-auction-paper.pdf>,(2007), pp. 253-264.

Chakraborty, Tanmoy et al., "Selective Call Out and Real Time Bidding", *WINE*, 2010, available at <http://arxiv.org/PS_cache/arxiv/pdf/1002/1002.3102v2.pdf>,(2010), pp. 1-24.

Charles, Denis et al., "Fast Algorithms for Finding Matchings in Lopsided Bipartite Graphs with Applications to Display Ads", *EC '10: Proceedings of the 11th ACM conference on Electronic commerce*, pp. 121-128, New York, NY, USA, 2010. ACM, available at <http://research.microsoft.com/en-us/um/people/nikdev/pubs/waterlevel.pdf>,(2010), 8 pages.

Chickering, David M., et al., "Goal-Oriented Clustering", *Microsoft Research*, Available at <http://research.microsoft.com/en-us/um/people/dmax/publications/goalclust.pdf>,(May 2000), 9 pages.

Chickering, David M., et al., "Targeted Advertising with Inventory Management", *EC '00*, Available at <http://research.microsoft.com/en-us/um/people/dmax/publications/ec00.pdf>, (Aug. 25, 2000), 5 pages.

Chickering, David M., et al., "Targeted Internet Advertising Using Predictive Clustering and Linear Programming", *Microsoft Research*, Available at <http://www.mapscapital.com/files/TargetedAdsPredictiveClusters.pdf>, 7 pages, 2004.

Constantin, Florin et al., "An Online Mechanism for Ad Slot Reservations with Cancellations", *Proceedings of the twentieth Annual ACM-SIAM Symposium on Discrete Algorithms*, Available at <http://www.siam.org/proceedings/soda/2009/SODA09_137_constantinf.pdf>,(2009), pp. 1265-1274.

Davis, Jeff "Truviso 3.2", Retrieved from: <http://www.truviso.com/blog/> on Feb. 24, 2010, (Sep. 4, 2009), 6 pages.

Devanur, Nikhil R., et al., "The Adwords Problem: Online Keyword Matching with Budgeted Bidders Under Random Permutations", *In John Chuang, Lance Fortnow, and Pearl Pu, editors, ACM Conference on Electronic Commerce*, pp. 71-78. ACM, 2009, available at <http://research.microsoft.com/en-us/um/people/nikdev/pubs/adwords.pdf>,(2009), 8 pages.

Edelman, Benjamin et al., "Internet Advertising and the Generalized Second-Price Auction: Selling Billions of Dollars Worth of Keywords", Available at <http://rwj.berkeley.edu/schwarz/publications/gsp051003.pdf>,(Oct. 3, 2005), pp. 1-21.

Edelman, Benjamin et al., "Strategic Bidder Behavior in Sponsored Search Auctions", *Decision Support Systems*, vol. 43, Issue 1, Available at <http://www.benedelman.org/publications/cycling-060703.pdf>,(Feb. 2007), pp. 1-12.

Feldman, Jon et al., "Budget Optimization in Search-Based Advertising Auctions", *EC 2007*, Available at <http://algo.research.googlepages.com/uniform.pdf>,(Jun. 2007), pp. 40-49.

Feldman, Jon et al., "Offline Optimization for Online Ad Allocation", *Fifth Workshop on Ad Auctions 2009*, Available at <http://www.eecs.harvard.edu/cs286r/papers/adauctions2009.pdf>,(2009), 8 pages.

Feldman, Jon et al., "Online Stochastic Matching: Beating 1-1/e", *In FOCS '09: Proceedings of the 2009 50th Annual IEEE Symposium on Foundations of Computer Science*, pp. 117-126, Washington, DC, USA, 2009. IEEE Computer Society, available at <http://ieeexplore.ieee.org/stamp/stamp.jsp?tp=&arnumber=5438641>,(2009), pp. 117-126.

Fleischer, Lisa K., "Approximating Fractional Multicommodity Flow Independent of the Number of Commodities", *Siam J. Discret. Math.*, 13(4):505-520, 2000, available at <http://researchweb.watson.ibm.com/people/l/lkf/papers/lpmulti.pdf>,(2000), 16 pages.

Garg, Naveen et al., "Faster and Simpler Algorithms for Multicommodity Flow and other Fractional Packing Problems", *In FOCS '98: Proceedings of the 39th Annual Symposium on Foundations of Computer Science*, p. 300, Washington, DC, USA, 1998. IEEE Computer Society, available at <http://citeseerx.ist.psu.edu/viewdoc/download?doi=10.1.1.130.6527&rep=rep1&type=pdf >,(1998), 22 pages.

Goel, Ashish et al., "Price Based Protocols for Fair Resource Allocation:Convergence Time Analysis and Extension to Leontief Utilities", *Proceedings of the nineteenth annual ACM-SIAM symposium on Discrete algorithms*, available at <http://research.microsoft.com/en-us/people/hamidnz/fair-price-based-protocols-soda08.pdf>,(2008), 9 pages.

Goel, Gagan et al., "Online Budgeted Matching in Random Input Models with Applications to Adwords", *Proceedings of the Nineteenth Annual ACM-SIAM Symposium on Discrete Algorithms*, Available at <http://delivery.acm.org/10.1145/1350000/1347189/p982-goel.pdf?key1=1347189&key2=2167314621&coll=GUIDE&dl=GUIDE&CFID=74230087&CFTOKEN=71191607>,(2008), pp. 982-991.

Hoeffding, Wassily "Probability Inequalities for Sums of Bounded Random Variables", *Journal of the American Statistical Association*, vol. 58, No. 301, Abstract, Retrieved from: <http://www.jstor.org/pss/2282952> on Jan. 21, 2010,(Mar. 1963), 2 pages.

Kalyanasundaram, Bala et al., "An Optimal Deterministic Algorithm for Online B-Matching", *Theor. Comput. Sci.*, 233(1-2):319-325, 2000, available at <http://citeseerx.ist.psu.edu/viewdoc/download?doi=10.1.1.56.8916&rep=rep1&type=pdf>,(2000), 9 pages.

Kamath, Anil et al., "Routing and Admission Control in General Topology Networks with Poisson Arrivals", *In SODA '96: Proceedings of the seventh annual ACM-SIAM symposium on Discrete algorithms*, pp. 269-278, Philadelphia, PA USA, 1996. Society for Industrial and Applied Mathematics, available at <http://citeseerx.ist.psu.edu/viewdoc/download?doi=10.1.1.31.5443&rep=rep1&type=pdf>,(1996), 10 pages.

Karande, Chinmay et al., "Online Bipartite Matching with Unknown Distributions", *STOC '11*, Jun. 6-8, 2011, San Jose, CA, retrieved from <http://portal.acm.org/citation.cfm?id=1993715&preflayout=flat> on Aug. 3, 2011,(Jun. 6, 2011), pp. 587-596.

Karp, Richard M., "An Optimal Algorithm for On-Line Bipartite Matching", *Proceedings of the Twenty-Second Annual ACM Symposium on Theory of Computing*, Available at <http://www.eecs.berkeley.edu/~vazirani/pubs/online.pdf>,(1990), pp. 352-358.

Kleinberg, Robert "A Multiple-Choice Secretary Algorithm with Applications to Online Auctions", *Proceedings of the Sixteenth Annual ACM-SIAM Symposium on Discrete Algorithms*, http://delivery.acm.org/10.1145/1080000/1070519/p630-kleinberg.pdf?key1=1070519&key2=0877314621&coll=GUIDE&dl=GUIDE&CFID=72544299&CFTOKEN=88467143,(2005), pp. 630-631.

Lahaie, Sebastien "An Analysis of Alternative Slot Auction Designs for Sponsored Search", *EC 2006*, Available at <http://research.yahoo.com/files/fp185-lahaie.pdf>,(Jun. 2006), 10 pages.

Mahdian, Mohammad "Allocating Online Advertisement Space with Unreliable Estimates", *ACM Conference on Electronic Commerce*, Available at <http://www.stanford.edu/~saberi/hamid-adwords.pdf>,(2007), pp. 1-11.

(56) References Cited

OTHER PUBLICATIONS

Mahdian, Mohammad et al., "Online Bipartite Matching with Random Arrivals: An Approach Based on Strongly Factor-Revealing", *STOC*, 2011, available at <http://mahdian.org/onlinematching.pdf>, (2011), 9 pages.

Manshadi, Vahideh et al., "Online Stochastic Matching: Online Actions Based on Offline Statistics", *SODA*, 2011, available at <http://arvix.org/pdf/1007.1673>,(Jul. 9, 2010), 15 pages.

Mehta, Aranyak et al., "Adwords and Generalized Online Matching", *Journal of the ACM (JACM)*, vol. 54, Issue 5, Available at <http://www.stanford.edu/~saberi/adwords.pdf>,(Oct. 2007), pp. 1-19.

Motwani, Rajeev et al., "Fractional Matching via Balls-And-Bins", *APPROX-RANDOM*, pp. 487-498, 2006, available at <http://citeseerx.ist.psu.edu/viewdoc/download?doi=10.1.1.94.6903&rep=rep1&type=pdf>,(2006), 11 pages.

Nisan, Noam "Algorithmic Game Theory", *Sponsored Search Auctions*, Available at <http://www.stanford.edu/~saberi/sponsored-search.pdf>,(Sep. 24, 2007), pp. 1-25.

Nodelman, URI et al., "Continuous Time Bayesian Networks", *Stanford University*, Available at <http://ai.stanford.edu/~nodelman/papers/ctbn.pdf>,(Jun. 10, 2007), 11 pages.

Plotkin, Serge A., et al., "Fast Approximation Algorithms for Fractional Packing and Covering Problems", *SFCS '91: Proceedings of the 32nd annual symposium on Foundations of computer science*, pp. 495-504, Washington, DC, USA, 1991. IEEE Computer Society, available at <http://ieeexplore.ieee.org/stamp/stamp.jsp?tp=&arnumber=185411>,(1991), pp. 495-504.

Radovanovic, Ana et al., "Revenue Maximization Through 'Smart' Inventory Management in Reservation-Based Online Advertising", *SIGMETRICS Performance Evaluation Review*, available at <http://www.anaradovanovic.com/AllocPoliciesMaMAsub.pdf>,(2010), 3 pages.

Rangarajan, et al., "Online Resource Allocation Algorithms", U.S. Appl. No. 13/288,650, (Nov. 3, 2011), 44 pages.

Ranjan, Supranamaya et al., "High-Performance Resource Allocation and Request Redirection Algorithms for Web Clusters", retrieved from http://ieeexplore.ieee.org/stamp/stamp.jsp?arnumber=04407691, Proceedings of IEEE Transactions on Parallel and Distributed Systems,(Sep. 2008), pp. 1186-1200.

Regelson, Moira et al., "Predicting Click-Through Rate Using Keyword Clusters", *EC '06*, Available at <http://citeseerx.ist.psu.edu/viewdoc/download?doi=10.1.1.130.9999&rep=rep1&type=pdf>,(Jun. 11, 2006), 6 pages.

Schwind, Michael et al., "Using Shadow Prices for Resource Allocation in a Combinatorial Grid With Proxy-Bidding Agents", available at <http://www/wiiw.de/publikationen/UsingShadowPricesforResourceAI1596.pdf/~saberi/adwords.pdf>,(2006), 8 pages.

Varian, Hal R., "Position Auctions", *International Journal of Industrial Organization*, vol. 25, Available at <http://people.ischool.berkeley.edu/~hal/Papers/2006/position.pdf>,(2007),pp. 1163-1178.

Vee, Erik et al., "Optimal Online Assignment with Forecasts", *EC '10: Proceedings of the 11th ACM conference on Electronic commerce*, pp. 109-118, New York, NY, USA, 2010. ACM , available at <http://citeseerx.ist.psu.edu/viewdoc/download?doi=10.1.1.155.161&rep=rep1&type=pdf>,(2010), 19 pages.

Vickrey, William "Counterspeculation, Auctions, and Competitive Sealed Tenders", Journal of Finance, vol. 16, Issue 1,(Mar. 1961), pp. 8-37.

Young, Neal E., "Randomized Rounding without Solving the Linear Program", *SODA '95: Proceedings of the sixth annual ACM-SIAM symposium on Discrete algorithms*, pp. 170-178, Philadelphia, PA, USA, 1995. Society for Industrial and Applied Mathematics, available at <http://arxiv.org/pdf/cs/0205036>,(1995), 10 pages.

"Non-Final Office Action", US. Appl. No. 12/757,634, Jun. 19, 2014, 7 pages.

"Non-Final Office Action", U.S. Appl. No. 13/288,650, Mar. 20, 2014, 13 pages.

"Notice of Allowance", U.S. Appl. No. 12/732,031, Jun. 3, 2014, 10 pages.

"Notice of Allowance", U.S. Appl. No. 12/751,533, May 9, 2014, 11 pages.

"Final Office Action", U.S. Appl. No. 13/348,465, Jul. 8, 2014, 18 pages.

"Non-Final Office Action", U.S. Appl. No. 12/732,031, Aug. 15, 2014, 6 pages.

"Non-Final Office Action", U.S. Appl. No. 12/751,533, Aug. 14, 2014, 6 pages.

"Non-Final Office Action", U.S. Appl. No. 12/761,961, Jul. 3, 2014, 13 pages.

"Non-Final Office Action", U.S. Appl. No. 13/288,650, Oct. 24, 2014, 16 pages.

* cited by examiner

GRAPH CLUSTERING

BACKGROUND

A graph (G) is typically a structure consisting of a set of vertices (V) and a set of edges (E) used to represent relationships between the vertices. For instance, a participation graph can be used to relate entities one to another based upon common conditions, properties, parameters, characteristics, activities, connections, and so forth. Such graphs may be employed for analysis of corresponding data sets in many scenarios. An example of such a scenario is in the context of online ad auctions for ad space that is associated with resources from a service provider. In the ad auction context, an auction participation graph is a structure that contains vertices representing advertisers who compete in the auctions and edges that connect two vertices when advertisers represented by the vertices are related by participating in auctions together. The auction participation graph contains a wealth of information that has many applications including advertiser flighting, suggestion of keywords to advertisers, micro-market analysis, and so forth.

Often, analysis of a graph of this type involves finding meaningful subsets or clusters within the graph. For the example auction participation graph, this may correspond to clustering the graph to identify submarkets in the advertiser graph that have relatively low interaction one to another. More generally, clustering may involve identifying clusters to optimize some objective function. Clustering a graph, though, can become quite difficult as the graph becomes larger (more vertices) and more dense (more edges between the vertices) due to the number of computations involved in the clustering. Thus, traditional algorithms used to directly cluster graphs may be unable to successfully perform clustering for larger and denser graphs that arise in some scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for graph clustering. In one or more embodiments, a participation graph is obtained that represents relationships between entities. An auxiliary graph is constructed based on the participation graph. The auxiliary graph may be constructed such that the auxiliary graph is less dense than the participation graph and is therefore computationally less complex to analyze. Clusters in the auxiliary graph are determined by solving an objective function defined for the auxiliary graph. Clusters determined for the auxiliary graph may then be utilized to ascertain clusters in the participation graph that solve a related objective function defined for the participation graph.

DETAILED DESCRIPTION

Overview

Various embodiments provide techniques for graph clustering. In one or more embodiments, a participation graph is obtained that represents relationships between entities. An auxiliary graph is constructed based on the participation graph. The auxiliary graph may be constructed such that the auxiliary graph is less dense than the participation graph and is therefore computationally less complex to analyze. Clusters in the auxiliary graph are determined by solving an objective function defined for the auxiliary graph. Clusters determined for the auxiliary graph may then be utilized to ascertain clusters in the participation graph that solve a related objective function defined for the participation graph.

In the discussion that follows, a section entitled "Operating Environment" describes but one environment in which the various embodiments can be employed. Following this, a section entitled "Graph Clustering Procedures" describes example techniques for graph clustering in accordance with one or more embodiments. Next, a section entitled "Graph Clustering Implementation Details" describes example algorithms and implementations for graph clustering in accordance with one or more embodiments. Last, a section entitled "Example System" is provided and describes an example system that can be used to implement one or more embodiments.

Operating Environment

Figure 1:
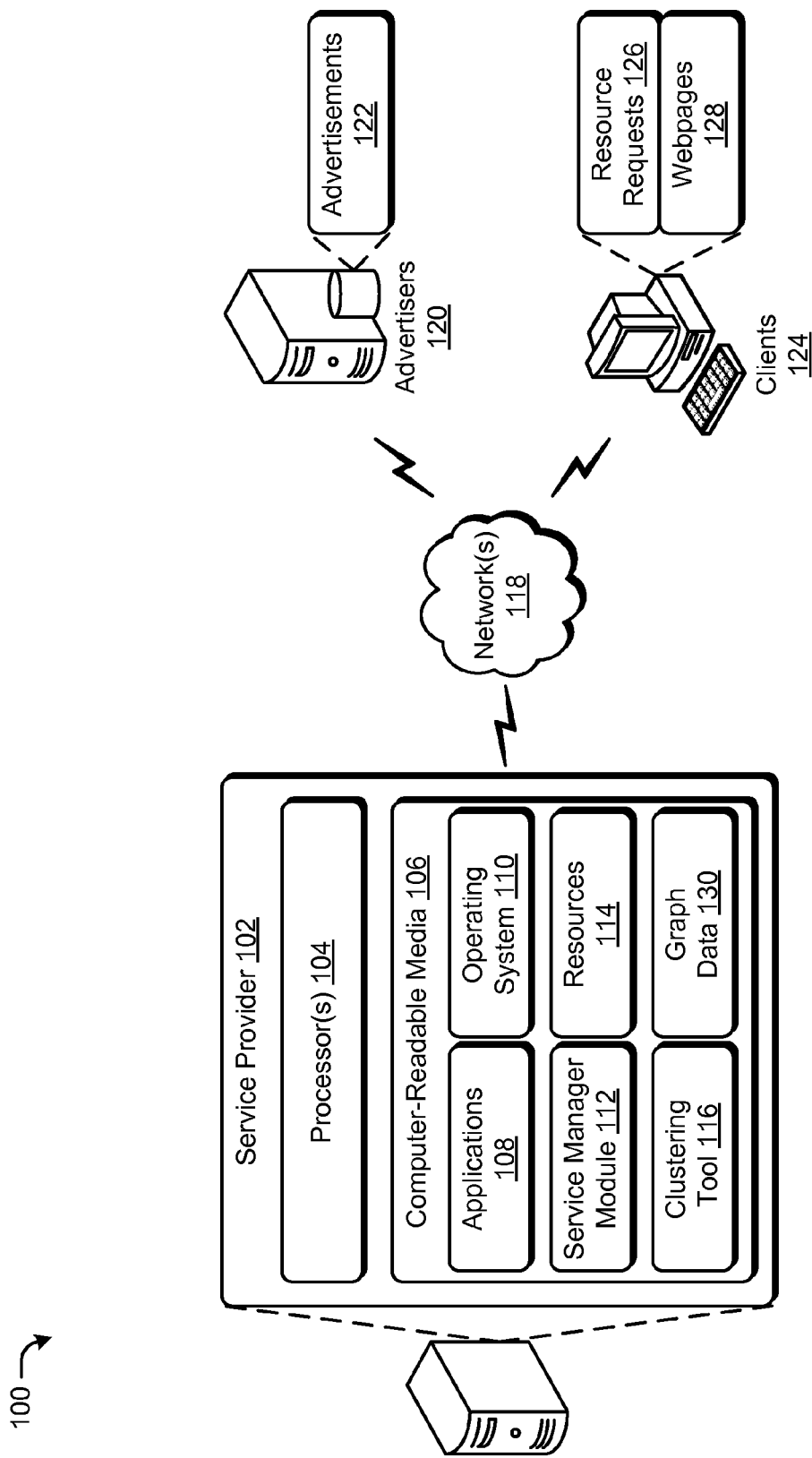
FIG. 1 illustrates an example operating environment in which one or more embodiments of graph clustering can be employed.

FIG. 1 illustrates an operating environment in accordance with one or more embodiments, generally at 100. Environment 100 includes a service provider 102 having one or more processors 104, one or more computer-readable media 106 and one or more applications 108 that are stored on the computer-readable media and which are executable by the one or more processors 104. The computer-readable media 106 can include, by way of example and not limitation, all forms of volatile and non-volatile memory and/or storage media that are typically associated with a computing device. Such media can include ROM, RAM, flash memory, hard disk, optical disks, removable media, and the like. Computer-readable media 106 is also depicted as storing an operating system 110, a service manager module 112, resources 114 (e.g., content, services, and data), and a clustering tool 116 that may also be executable by the processor(s) 104. While illustrated separately, the clustering tool 116 may also be implemented as a component of the service manager module 112.

Service provider 102 can be embodied as any suitable computing device or combination of devices such as, by way of example and not limitation, a server, a server farm, a peer-to-peer network of devices, a desktop computer, and the like. One specific example of a computing device is shown and described below in relation to FIG. 6. Service provider 102 can be communicatively coupled over a network 118 to various other entities (e.g., devices, servers, storage locations, clients, and so forth). In particular, service provider 102 is illustrated as being connected over the network 118 to advertisers 120 that provide advertisements 122 and clients 124. Advertisers 120 and clients 124 may interact over the network 118 with the service provider 102 to obtain access to various resources 114. Although the network 118 is illustrated as the Internet, the network may assume a wide variety of configurations. For example, the network 118 may include a wide area network (WAN), a local area network (LAN), a wireless network, a public telephone network, an intranet, and so on. Further, although a single network 118 is shown, the network 118 may be configured to include multiple networks.

Service manager module 112 represents functionality operable by service provider 102 to manage various resources 114 that may be made available over the network 118. Service manager module 112 may manage access to the resources 114, performance of the resources 114, configuration of user interfaces or data to provide the resources 114, and so on. For example, clients 124 may form resource requests 126 for communication to the service provider 102 to obtain corresponding resources 114. In response to receiving such requests, service provider 102 can provide various resources 114 via webpages 128 and/or other user interfaces that are communicated over the network 118 for output by the one or more clients 124.

Resources 114 can include any suitable combination of content and/or services typically made available over a network by one or more service providers. Content can include various combinations of text, video, ads, audio, multi-media streams, animations, images, and the like. Some examples of services include, but are not limited to, a search service, an email service to send and receive email, an instant messaging service to provide instant messages between clients, and a social networking service to facilitate connections and interactions between groups of users who share common interests and activities. Services may also include an advertisement service configured to enable advertisers 120 to place advertisements 122 for presentation to clients 104 in conjunction with resources 114.

For instance, at least some of the webpages 128 can be configured to include advertisements 122 provided by the advertisers 120. Advertisements 122 may be selected for inclusion in webpages through an advertisement service using any suitable techniques for selection and delivery of the ads. In one example, auctions may be conducted for space that is reserved in a webpage 128 for advertisements 122 from the advertisers 120.

The clustering tool 116 is configured to implement aspects of graph clustering techniques described herein. The clustering tool 116 may be configured to make use of various graph data 130 that may be collected, stored, and/or accessed via the service provider 102. Although the example graph data 130 of FIG. 1 is illustrated as being stored on computer-readable media 106 of the service provider 102, it is contemplated that graph data 130 may be compiled and stored at and/or obtained from any suitable local or network storage location by way of any suitable device. The graph data 130 may represent various data sets that may be used to construct graphs that in turn may be the subject of analysis performed by the clustering tool 116. In particular, the auction clustering tool 116 represents functionality operable to at least obtain suitable graphs using the graph data, apply various clustering algorithms to the graphs and/or otherwise analyze the graphs, and ascertain clusters based on the analysis of the graphs. As noted clustering may involve optimization of some objective function. Accordingly, the clustering tool 116 may also be implemented to enable objective functions to be defined. Clustering algorithms described herein can then be used to test the objective functions. Further discussion of objective functions and graph clustering techniques that may be implemented by way of the clustering tool 116 can be found in relation to the following figures.

Having considered an example operating environment, consider now a discussion of example graph clustering techniques in accordance with one or more embodiments.

Graph Clustering Procedures

The following discussion describes graph clustering techniques that may be implemented utilizing the environment, systems, and/or devices described above and below. Aspects of each of the procedures below may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
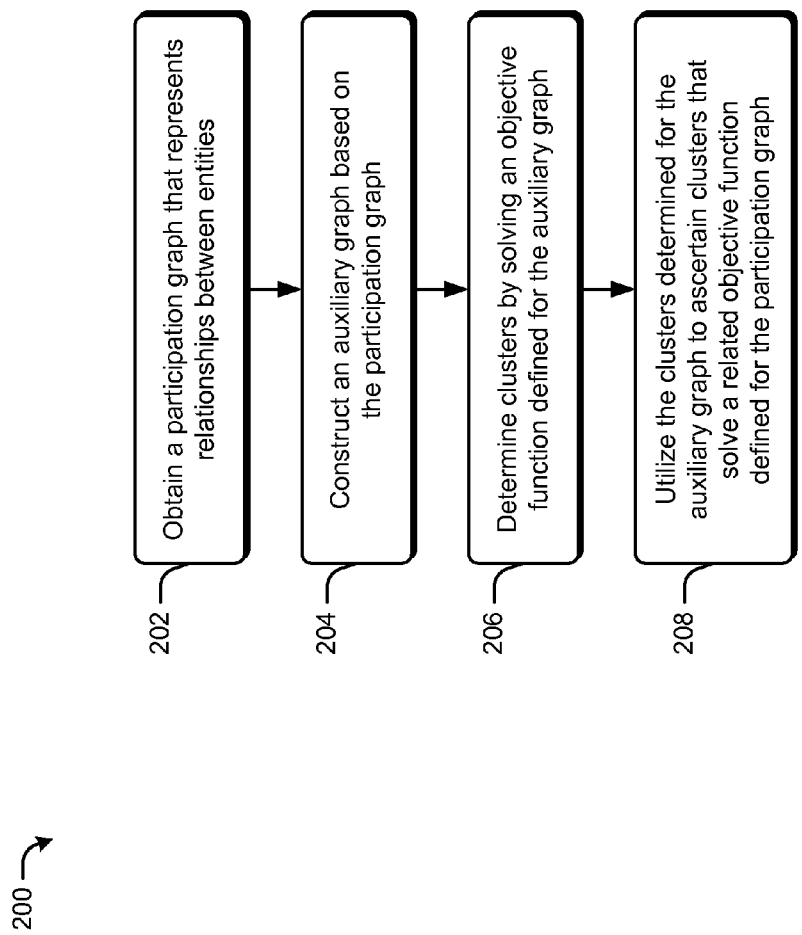
FIG. 2 is a flow diagram that describes an example procedure in accordance with one or more embodiments.

FIG. 2 is a flow diagram that describes an example procedure 200 in accordance with one or more embodiments. In at least some embodiments, the procedure 200 can be performed by a suitably configured computing device, such as a service provider 102 of FIG. 1, or other computing device having a graph clustering tool 116.

Step 202 obtains a participation graph that represents relationships between entities. One way this can occur is by operation of a clustering tool 116 to construct a graph using graph data 130. Additionally or alternatively, clustering tool 116 may be configured to receive a previously constructed graph as input from any suitable source. Clustering tool 116 may then operate to perform graph clustering techniques on the obtained graph using various algorithms.

As noted, a graph (G) as used herein refers to a structure consisting of a set of vertices (V) and a set of edges (E) used to represent relationships between the vertices. For instance, a participation graph can be used to relate entities one to another based upon common conditions, properties, parameters, characteristics, activities, connections, and so forth. In the context of online ad auctions for ad space that is associated with resources 114 from a service provider 102, an auction participation graph is a structure that contains vertices (A) representing advertisers who compete in the auctions and edges (E) that connect two vertices when advertisers represented by the vertices are related by participating in auctions together.

Step 204 constructs an auxiliary graph based on the participation graph. As noted, sometimes a participation graph (e.g., an auction participation graph) can be too dense to permit efficient analysis. Accordingly, to enable more efficient analysis, the clustering tool 116 may be implemented to construct an auxiliary graph corresponding to the participation graph that is easier to work, and involves less computations to analyze. Generally speaking, the auxiliary graph is constructed to contain fewer edges and thus is less dense than the corresponding participation graph. One example of an auxiliary graph that can be constructed is a bipartite graph, which is described in greater detail relation to the following figures. Briefly, though, the bipartite graph introduces vertices representing the relationships in the participation graph and connects entities to the relationship vertices rather than one to another. By so doing, the number of edges used to represent the data set can be reduced.

In at least some embodiments, additional modifications are applied to the bipartite graph to further optimize the graph clustering techniques. Example modifications are described below in the section entitled "Graph Clustering Implementation Examples."

Step 206 determines clusters by solving an objective function defined for the auxiliary graph. For instance, given the auxiliary graph constructed in step 204, clusters may be determined in the auxiliary graph by solving an objective function The clustering tool 116 may be implemented to make use of various suitable objective functions that are constructed to optimize clustering. In general, suitable objective functions that may be employed (1) measure the number of edges that are removed to form a cluster and (2) penalize larger clusters. The cluster size penalty prevents the algorithm from returning the entire data set as a result of the clustering. Suitable objective functions of this type result in clusters that have a relatively large number of edges within the cluster (close relationships), have relatively few edges leading outside to other clusters (loosely tied to other clusters), and are reasonable in size. Clusters having these characteristics may be desirable because such clusters represent groups of entities who interact often and/or share many common properties. In the ad auction context, the clusters may correspond to isolated sub-markets that are considered good candidates for various market analyses. Further details regarding suitable objective functions can be found in relation to the following figures.

Step 208 utilizes the clusters determined for the auxiliary graph to ascertain clusters that solve a related objective function defined for the participation graph. The clustering tool 116 may be configured to reconstruct clusters in the participation graph based upon the clusters obtained from clustering the auxiliary graph. This can involve identifying entities contained in the clusters from the auxiliary graph and forming edges between the entities to reconstruct a cluster that corresponds to a portion of the participation graph.

In particular, an objective function that is employed to cluster the auxiliary graph can be derived from a related objective function defined for the participation graph. Therefore, as described in greater detail below, by carefully designing the objective functions that are used for clustering, clusters that are derived for the auxiliary graph can be used directly to obtain clusters corresponding to the participation graph. In some embodiments, the auxiliary graph is modified to optimize clustering as discussed above and below. These modifications determine the relationship between the objective functions for the participation graph and auxiliary graph.

For instance, when a bipartite graph is employed as the basis for graph clustering techniques, the result of clustering is a set of vertices representing entities that are connected to relationship vertices. A corresponding cluster for the participation graph can be obtained by interconnecting the entities one to another in accordance with their shared connections to the relationship vertices. This involves a simple translation between the bipartite graph and the corresponding participation graph.

Figure 3:
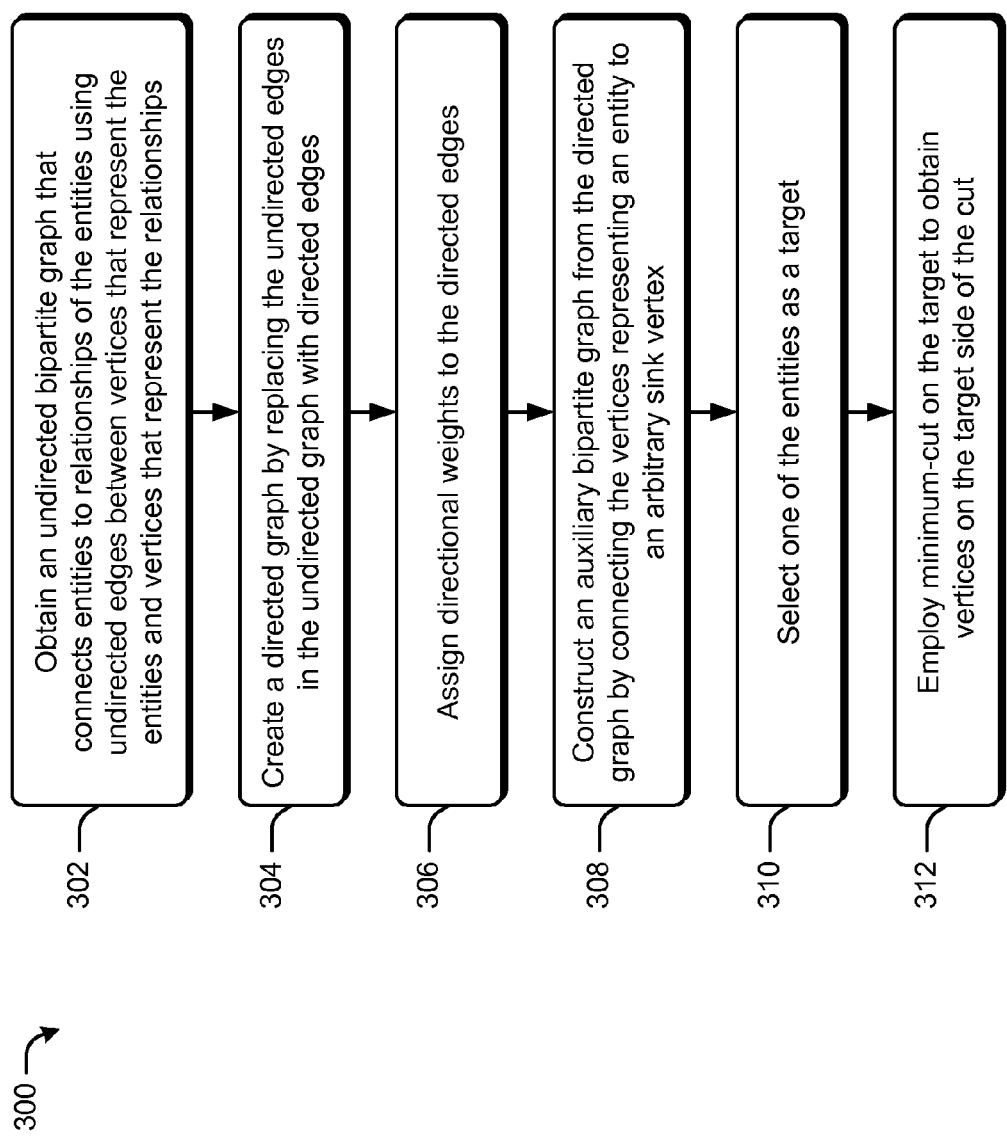
FIG. 3 is a flow diagram that describes another example procedure in accordance with one or more embodiments.

FIG. 3 is a flow diagram that describes another example procedure 300 in accordance with one or more embodiments. In at least some embodiments, the procedure 300 can be performed by a suitably configured computing device, such as a service provider 102 of FIG. 1 having a clustering tool 116. In particular, FIG. 3 describes an example procedure that can be employed to construct an auxiliary graph. Portions of procedure 300 are described in relation to an example auction between advertisers 120 for ad space that may be used to present advertisements 122 to clients 124 in conjunction with resources 114. In the discussion of procedure 300, reference may be made to the example participation graph and corresponding bipartite graph that are depicted in FIG. 4.

Step 302 obtains an undirected bipartite graph that connects entities to relationships of the entities using undirected edges between vertices that represent the entities and vertices that represent the relationships. One way this can occur is by operation of a clustering tool 116 to create a bipartite graph from a corresponding participation graph or data set. Additionally or alternatively, the clustering tool 116 is capable of generating or otherwise obtaining a bipartite graph for a data set directly from graph data 130.

Figure 4:
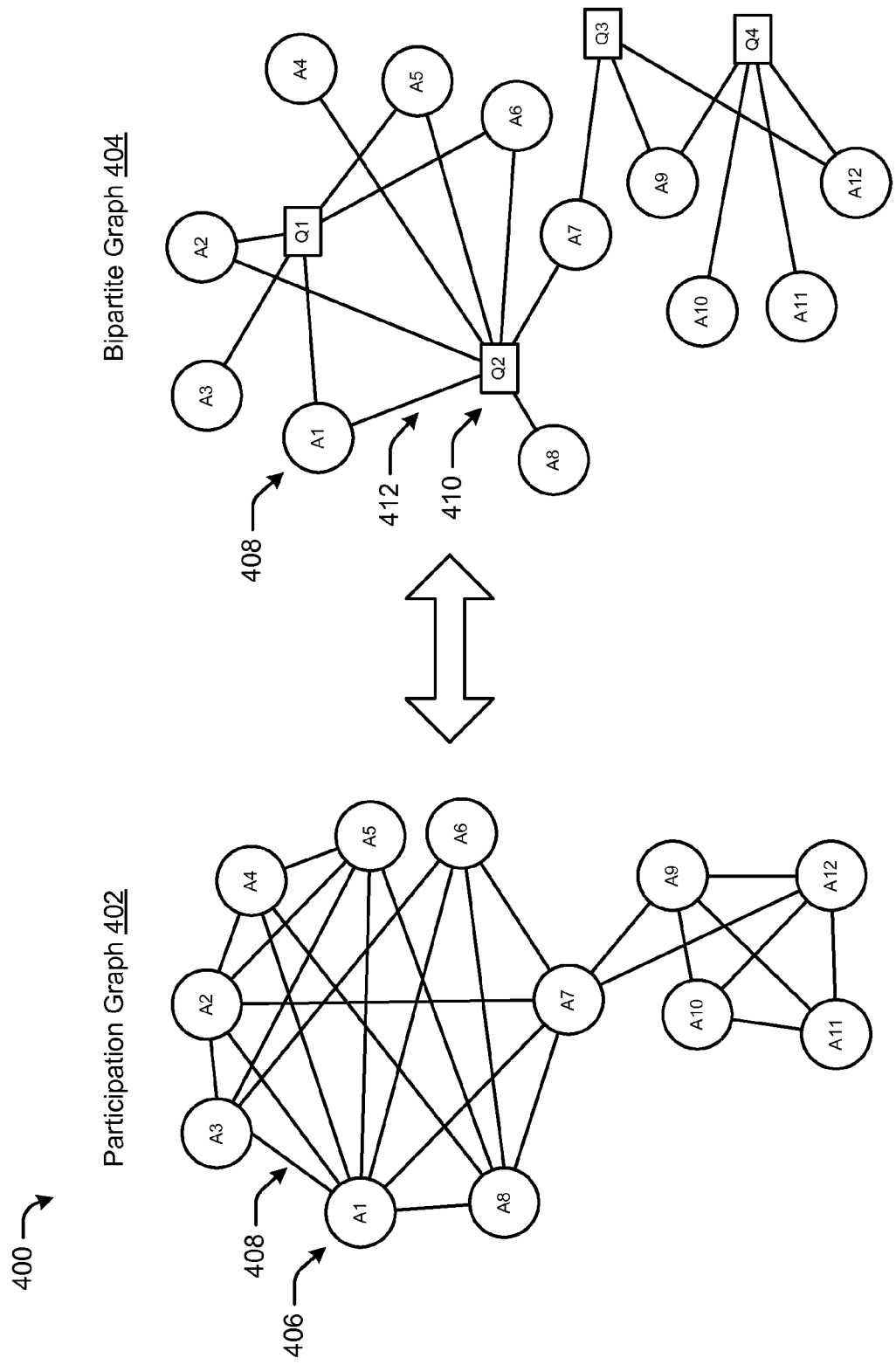
FIG. 4 is a diagram that depicts an example of a participation graph and a corresponding bipartite in accordance with one or more embodiments.

Consider now FIG. 4, which depicts generally at 400 an example of a participation graph 402 and a corresponding bipartite graph 404. The participation graph includes a plurality of vertices 406 that are connected one to another by edges 408. In the example of an auction participation graph, the vertices 406 represent auction participants (e.g., advertisers 120) and the edges 408 connect vertices when corresponding auction participants have participated in an auction together.

Similar graphs can be constructed to represent a variety of relationships. As noted, relationships that exist between entities can include common conditions, properties, parameters, characteristics, activities, connections, and so forth. By way of example and not limitation, graphs similar to participation graph 402 can be used to relate webpages to links shared by the webpages, advertisers to keywords or search terms, auction participants to locations, webpages to ad revenue, or otherwise represent a data set by showing relationships that exist between entities of the data set.

Generally speaking the bipartite graph 404 introduces vertices 410 representing the relationships in the participation graph and connects entities to the relationship vertices 410 using edges 412. Continuing the example of the auction participation graph, vertices 410 may represent auctions. Accordingly, a participant vertex 408 representing an auction participant in the bipartite graph 404 is connected by an edge 412 to a vertex 410 representing an auction when the participant participated in the auction. As illustrated in FIG. 4, translating back and forth between the participation graph 402 and a corresponding bipartite graph 404 is straightforward. Notice that the density (number of edges) is lower in the bipartite graph 404 compared to the participation graph 402. Again, this enables simplified calculations to be employed to cluster the bipartite graph 404.

The bipartite graph just described is a starting point for graph clustering techniques described herein. In practice, further modifications are made to produce an optimal graph that can be clustered effectively using an objective function of the type described above and below. Some examples of such modifications are described generally in the continuing discussion of procedure 300 of FIG. 3 just below. Details regarding example modifications can be found in the section entitled "Graph Clustering Implementation Examples" that follows.

Returning now to the discussion of FIG. 3, step 304 creates a directed graph by replacing the undirected edges in the undirected graph with directed edges. In other words, edges between vertices of the bipartite graph are each replaced with two edges that travel in opposite directions between the vertices. This is akin to replacing a two-way road with two one-way roads. For the purpose of clustering, this enables clustering tool 116 to handle connections from a entity (e.g., advertiser) to a relationship (e.g., auction) differently than connections from a relationship (e.g., auction) to an a entity (e.g., advertiser).

Step 306 assigns directional weights to the directed edges. In particular, clustering tool 116 may assign weights to edges formed in step 306 according to the direction of the edges. When a graph clustering algorithm is applied, the weights have the effect of penalizing removal of some edges and/or vertices from a cluster. For instance the weight may correspond to a cost to remove a vertex by cutting a corresponding edge to produce a cluster. Thus, directional weights applied to the directed edges can be used to make cuts in one direction more costly than cuts in the other direction. In at least some embodiments, a relatively higher weight is assigned to edges traveling from an entity to a relationship, and a relatively lower weight is assigned to edges traveling from a relationship to an entity. The effect is to make it more difficult to cut an entity from an adjacent relationship. For example, a weight of infinity can be assigned to edges traveling from an advertiser to an auction and a weight of one can be assigned to edges traveling from an auction to an advertiser. Of course, various suitable values for edge weights can be employed and can be adjusted to fine-tune graph clustering. Although some examples herein use infinite edges weights, in practice finite values can be employed for simplicity.

Step 308 constructs an auxiliary bipartite graph from the directed graph by connecting the vertices representing an entity with an edge to an arbitrary sink vertex. By so doing, a cost is created for every entity (e.g., advertiser) that is included in a cluster. This is because the edges connected to the arbitrary sink vertex are disconnected when clustering occurs. The edges to the sink vertex can also be weighted using adjustable weights. Edge weights assigned to edges connected to the sink vertex are denoted as a in the following discussion.

Following step 308, an auxiliary graph has been constructed that can be used as an input for graph clustering techniques. Effectively, a general clustering problem for a dense graph has been reduced to a problem of finding clusters within a relatively sparse auxiliary graph. In particular, by constructing the auxiliary bipartite graph in the manner described, the clustering problem is reduced to creating clusters that minimize the number of edges that are cut (e.g., removed) to form the clusters. In at least some embodiments, this can occur by operation of the clustering tool 116 to apply a minimum-cut algorithm to the auxiliary bipartite graph that is generated in the manner described above.

In particular, step 310 selects one of the entities as a target, then step 312 employs minimum-cut on the target to obtain vertices on the target side of the cut. In the example of an auction participation graph, the result obtained is a cluster having a set of advertisers that are connected by edges to auctions in which they participate. This is a subset of the bipartite graph. Now, a corresponding cluster for the auction participation graph can be derived by directly translating the resultant cluster from a bipartite graph form to a participation graph form. Details regarding the minimum-cut algorithm are addressed in the following section.

Having described example procedures involving graph clustering, consider now specific implementation examples that can be employed with one or more embodiments described herein.

Graph Clustering Implementation Examples

Consider now a discussion of clustering algorithms and implementations that may be employed using the previously described devices and systems. In particular, consider the problem of finding clusters in an auction participation graph. More precisely, let A be the set of advertisers. Define a graph $G=(A, E)$ where the set of edges is:

$$E=\{(a,b): a \text{ and } b \text{ participated in an auction}\}$$

Although the following techniques are described in relation to an example in which advertisers and auctions are related by an auction participation graph, it should be apparent that the techniques may be easily applied to other graphs (G) consisting of a set of vertices (V) and a set of edges (E) used to represent relationships between the vertices. In other words, the graph clustering techniques described herein in are generally applicable to graphs of the form $G=(V,E)$.

Informally, the problem of clustering G is to find a subset of vertices $C \subset A$ such that the weight of edges crossing the cluster is low (such a cluster is said to have low conductance), and the weight of the edges in the cluster is high (such a cluster is said to have high density).

The graph $G=(A,E)$ can unfortunately become too dense to efficiently cluster. To see this, consider an auction in which the advertisers $a_1, \ldots a_n$ participated. Such an auction introduces $$\frac{n(n-1)}{2}$$

edges to the graph. Traffic for an example ad delivery system may contain 10 billion edges for just a 1% sample of one day's advertising inventory and corresponding auctions. Further, existing clustering algorithms have running times on the order of $O(|V|^2|E|)$ time steps for a graph $G=(V,E)$. Therefore, reducing edges may substantially improve performance of graph clustering.

To this end, the participation graph defined above can be replaced with a corresponding bipartite graph $G_b=A \cup Q, E_b)$ where Q is the set of auctions, and thus $(a,q) \in E_b$ if a participated in an auction q. The graph $G_b$ is constructed so as to contain one edge between an auction and an advertiser and thus is sparse assuming a small set of advertisers participate in a particular auction. Accordingly, analysis of the graph $G_b$ may be faster and less computationally taxing than analysis of the participation graph.

As described in detail in the following discussion, it can be shown that finding small clusters of low conductance in the bipartite graph $G_b$ can be related to finding small low-conductance clusters in the original graph G. Strictly speaking, advertisers in a cluster derived for the bipartite graph $G_b$ may be used directly to construct a corresponding cluster for the participation graph G. To do so, an objective function for the bipartite graph $G_b$ is defined that when solved also solves a related objective function for the original graph G.

For the purposes of example, the graph clustering techniques are described in relation to clustering algorithms which find clusters H that minimize an objective function of the form $f(H)=(H,\overline{H})+(H)$, where g(H) is a function that penalizes large clusters H and $e_G(H,\overline{H})=\Sigma_{u \in H, v \in \overline{H}} w_G(u,v)$ where, $w_G(u,v)$ is the total weight of edges between u and v. Here $\overline{H}$ is the complement of the set H.

For each cluster $H \subseteq G$ a cluster $H' \subseteq G_b$ can be associated by setting $H' \subseteq H \cup \Gamma(H)$ where $\Gamma(H)$ are the auctions adjacent to H. In particular, maps $\phi$ can be derived that take a cluster in G and associate the cluster to a cluster in $G_b$ that has the same set of advertisers, namely, $\phi(H) \cap A = H$.

Now, assume that g(H) has the following compatibility property with respect to the maps $\phi$:

$$g(H)=g(\phi(H)).$$

Another way to state this is that g is only a function of the advertisers in H, or that the function g factors as $g=g'(H \cap A)$. Examples of such functions are provided later in the discussion.

Consider the following proposition regarding solving objective functions for the graph G using the graph $G_b$. For Proposition A, let G have edge weights given by $$w(a, b) = \frac{1}{n^2},$$

if the vertices a and b participated in an auction with n other vertices. Let $G_b$ have edge weights given by $$w(q, a) = \frac{1}{n}$$

where q is an auction with n neighbors.

Suppose a clustering algorithm on $G_b$ exists that satisfies the following properties:
1. It minimizes a cluster objective function of the form $f(H)=e_{G_b}(H,\overline{H})+g(H)$ where g satisfies the compatibility property with respect to $\phi$.
2. $\Gamma(H \cap A) \subseteq H$ (in other words all auctions adjacent to advertisers in the cluster are also members of the cluster).

Then if $H \subseteq G_b$ is a cluster produced by the algorithm, then $H \cap A$ is a cluster in G that minimizes $f(H \cap A)=e_G(H \cap A, \overline{H \cap A})+g(H \cap A)$ in the graph G to within a constant factor.

To establish a Proof of Proposition A, let H be the cluster produced by the algorithm and set $\check{H}=H \cap A$ to be the cluster induced by H in G. Then $f(\check{H})=e_G(\check{H},\overline{\check{H}})+g(\check{H})=e_G(\check{H},\overline{\check{H}})+g(H)$ by the compatibility property of the function g. Thus, for the minimization problem, the focus can be placed on minimizing $e_G$.

Expanding the definition of $e_G$ it can be found that:

$$e_G(\check{H}, \overline{\check{H}}) = \sum_{q \in H \cap Q, a \in \check{H}, b \in \overline{\check{H}}} w(a, q)w(q, b)$$

$$= \sum_{q \in H \cap Q} \left(\sum_{a \in \check{H}} w(a, q)\right)\left(\sum_{b \in \overline{\check{H}}} w(q, b)\right)$$

$$= \sum_{q \in H \cap Q} w(q, \check{H})w(q, \overline{\check{H}}).$$

Where $w(q,\check{H})$ (resp. $w(q,\overline{\check{H}})$) is the sum of the edge weights from q to the vertices in $\check{H}$ (resp. $\overline{\check{H}}$).

Now notice that $w(q,\check{H})+w(q,\overline{\check{H}})=1$ and writing $\theta(q)=w(q,\check{H})$, it follows that $e_G(\check{H},\overline{\check{H}})=\Sigma_{q \in H \cap Q}(1-\theta(q))\theta(q)$.

Meanwhile, $e(H,\overline{H})=\Sigma_{q \in H \cap A} w(q,\overline{H})$ where the fact that $\Gamma(H \cap A) \subseteq H$ is used to compute the edge weight crossing the cluster. Using the $\theta$ notation $e_G(H,\overline{H})=\Sigma_{q \in H \cap Q}\theta(q)$.

A fundamental connection can be drawn that minimizing $e_G(\check{H},\overline{\check{H}})$ is the same as minimizing the variance of the random variable $X=\Sigma_q X_q$ where $X_q=(1-R_{\theta_q})$ and where $R_{\theta_q}$ is an indicator random variable that is 1 with probability $\theta_q$ and 0 with probability $1-\theta_q$. Further, minimizing $e(H,\overline{H})$ is the same as minimizing the expectation of the random variable X up to a constant factor.

These two minimization problems have approximately the same solution, i.e., maximize $\theta_q$. Moreover, the approximation factor can be shown to be $$\frac{1}{(1-\epsilon)}\left(1-\frac{\mu}{n}\right)-1$$

where is an upper bound on the and is the mean of the random variable. Technically, the minimization problem for variance admits a solution that minimizes $\theta_q$, but the same value of the objective function can be achieved by setting $\theta_q'=1-\theta_q$. Therefore, the cluster $\check{H}$ is optimal with respect to the function $f(\check{H})$ to within a constant factor.

Clustering the Bipartite Auction Participation Graph

With the above in mind, the discussion turns to consideration of a suitable algorithm that efficiently produces a cluster in the bipartite auction participation graph that satisfies all the hypotheses of Proposition A. This algorithm enables clusters of advertisers to be found in the participation graph by clustering the bipartite auction participation graph. The algorithm is described below in relation to three sub-algorithms (Algorithm A, Algorithm B, and Algorithm C) that are used to derive the clustering algorithm.

First consider the following simpler problem. Given an undirected graph $G=(V,E)$ and $s \in V$, find a subset $H \supseteq \{s\}$ of the vertices (containing s) that minimizes the objective function $e(H,\overline{H})+\alpha|H|$, where $\alpha>0$ is a constant. This algorithm is referred to as the Max-Flow algorithm and is discussed in Flake, G. W., R. E. Tarjan, and K. Tsioutsiouliklis. "Graph Clustering and Minimum Cut Trees." *Internet Math.* 1, no. 4 (2003): 285-408. As discussed therein, the Max-Flow algorithm may be used to find a minimum-cut (e.g., min-cut) for a given graph.

For Algorithm A, an auxiliary graph $G'=(V \cup \{t\}, E \cup \{(v,t): v \in V\})$ is constructed, where t is a new arbitrary sink vertex and the weight of the edges are set to $w(v,t)=\alpha$. Now using the Max-Flow algorithm, a minimum s-t cut in G' is computed. H is defined to be the set of vertices on the s side of the cut. By definition of the minimum-cut this gives a set H with $s \in H$, such that $e(H,\overline{H})+\alpha|H|$ is minimized (since the latter is the capacity of the cut).

In the application of Algorithm A above, clusters are obtained that optimize the objective function $e(H,\overline{H})+\alpha|H|$. Here the function $g(H)=\alpha|H|$ in the notation of the previous section. This function, however, does not satisfy the compatibility property with respect to the maps $\phi$ introduced above. Thus, simply applying minimum-cut to G' is insufficient. However, as shown next, the cluster can be optimized with respect to the function $e(H,\overline{H})+\alpha|H \cap A|$. Since the function $g(H)=\alpha|H \cap A|$ does satisfy the compatibility property required by Proposition A, this optimization moves closer to the objective of having a clustering algorithm that satisfies the hypothesis of the proposition.

For Algorithm B, consider again a bipartite graph of the form $G=(A \cup Q, E)$. To obtain an algorithm that finds a cluster H (with $s \in H$) that minimizes the objective function of $e(H,\overline{H})+\alpha|H \cap A|$, a simplification is made by constructing an auxiliary graph $G''=(A \cup Q \cup \{t\}, E \cup \{((v,t):v \in A\}$ and setting edge weights according to $w(v,t)=\alpha$. Now, applying Algorithm A to G'' now yields a cluster H that minimizes the objective function $e(H,\overline{H})+\alpha|H \cap A|$.

For Algorithm C, note that the clusters produced by Algorithm B may not satisfy the property: if $a \in H \cap A$ is an advertiser in the cluster, then $\Gamma(a) \subseteq H$. To remedy this, the weights of the edges in G can be adjusted directionally. In particular, set $w(a,q)=\infty$ whenever $(a,q) \in E$ where a is an advertiser and q is an auction and $w(q,a)$ has the $$\text{weight} = \frac{1}{n}$$

if n advertisers participated in the auction q in G. Call this graph with the new directed edge weights Ğ. Now, applying Algorithm B to the Ğ produces a cluster H that minimizes $e(H,\overline{H})+\alpha|H\cap A|$. Such a cluster H has the property that $\forall a\in H\cap A:\Gamma(a)\subseteq H$. This is true because, if $\Gamma(a)$ contains an auction q that does not belong to H then the objective function is infinite due to the directionally weighted edges. This contradicts the minimality of the objective function (since it can be made finite by adding $\Gamma(a)$ to H).

Figure 5:
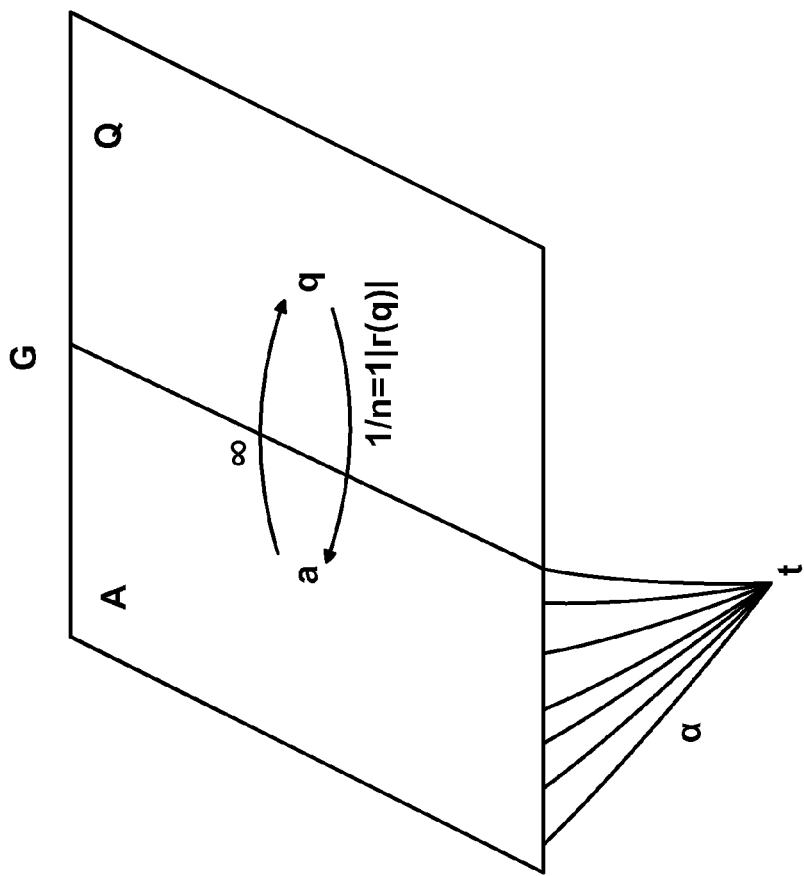
FIG. 5 is a diagram that depicts construction of an example auxiliary graph in accordance with one or more embodiments.

FIG. 5 illustrates the construction of the augmented graph that is formed in accordance with the foregoing algorithms. In particular, FIG. 5 shows a bipartite graph with a set of advertisers A on the left and a set of auctions Q on the right. The edges between A and Q are directed edges that have been assigned directional weights. In the example of FIG. 5, weights for edges from advertisers to auctions are set to ∞ and weights for edges from auctions to advertisers are set to a finite value, e.g., $$\text{weight} = \frac{1}{n}$$

if n advertisers participated in the corresponding auction. Vertices representing the advertisers are also illustrated as being connected to the sink vertex t with a weight of these edges set to α.

Now a second proposition regarding solving objective functions for the graph G using the graph $G_b$ can be stated. For Proposition B, let H be the output of Algorithm C on input $G_b=(A\cup Q,E_b)$, then $H\cap A$ minimizes the objective function $e_G(H\cap A,\overline{H\cap A})+\alpha|H\cap A|$ on the advertiser-participation graph G=(A,E).

To establish a Proof of Proposition B, the clustering Algorithm C satisfies all the hypothesis of Proposition A discussed above, and thus the conclusion follows.

Note that for the foregoing proof to be successful, an edge weight other than ∞ can be employed. It suffices to take $w(a,q)>\max_q\deg(q)=1$ (because of the weight normalization). Thus, in practice graph clustering techniques described herein can be applied using non-infinite weights when directionally weighting the directed edges introduced into the graph $G_b$.

Example System

Figure 6:
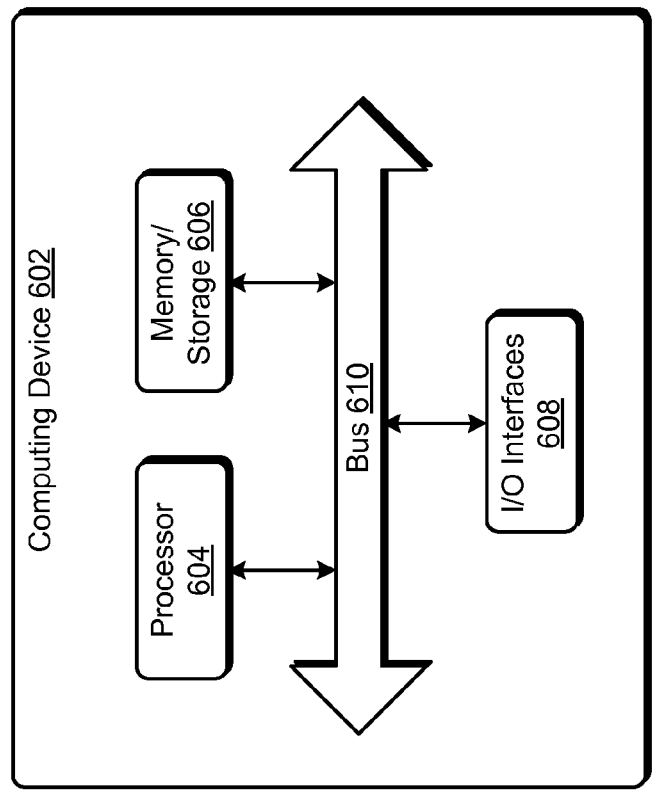
FIG. 6 is a block diagram of a system that can implement the various embodiments.

FIG. 6 illustrates generally at 600 an example computing device 602 that may implement the various embodiments described above. The computing device 602 may be, for example, a client 124 of FIG. 1, a server of a service provider 102, a server of an advertiser 120, or any other suitable computing device.

The computing device 602 includes one or more processors or processing units 604, one or more memory and/or storage components 606, one or more input/output (I/O) interfaces 608 for input/output (I/O) devices, and a bus 610 that allows the various components and devices to communicate one to another. The bus 610 represents one or more of several types of bus structures, including a memory bus or memory controller, a peripheral bus, an accelerated graphics port, and a processor or local bus using any of a variety of bus architectures. The bus 610 can include wired and/or wireless buses.

The memory/storage component 606 represents one or more computer storage media. The memory/storage component 606 may include volatile media (such as random access memory (RAM)) and/or nonvolatile media (such as read only memory (ROM), Flash memory, optical disks, magnetic disks, and so forth). The memory/storage component 606 may include fixed media (e.g., RAM, ROM, a fixed hard drive, etc.) as well as removable media (e.g., a Flash memory drive, a removable hard drive, an optical disk, and so forth).

The one or more input/output interfaces 608 allow a user to enter commands and information to computing device 600, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the graph clustering tool 116, applications 108, service manager module 112, operating system 110, and other program modules, may be embodied as one or more instructions stored on computer-readable storage media. The computing device 602 may be configured to implement particular functions corresponding to the software or program modules stored on computer-readable storage media. Such instructions may be executable by one or more articles of manufacture (for example, one or more computing device 602, and/or processors 604) to implement techniques for graph clustering, as well as other techniques. Such techniques include, but are not limited to, the example procedures described herein. Thus, computer-readable storage media may be configured to store instructions that, when executed by one or more devices described herein, cause various techniques for graph clustering.

The computer-readable storage media includes volatile and non-volatile, removable and non-removable media implemented in a method or technology suitable for storage of information such as computer readable instructions, data structures, program modules, or other data. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
    obtaining, by a computing device, a participation graph that represents relationships between entities;
    constructing an auxiliary graph based on the participation graph by at least:
        forming an undirected bipartite graph corresponding to the participation graph, the undirected bipartite graph connecting entities to relationships of the entities using undirected edges between vertices that represent the entities and vertices that represent the relationships;
        replacing the undirected edges in the undirected bipartite graph with directed edges to form a directed graph that is configured to facilitate minimization of an objective function defined for the auxiliary graph that measures a total weight of edges removed from the undirected bipartite graph to form the directed graph;
        assigning directional weights to the directed edges; and
        connecting vertices representing the entities in the directed graph to an arbitrary sink vertex to form the auxiliary graph;
    determining clusters by solving the objective function defined for the auxiliary graph; and
    utilizing the clusters determined for the auxiliary graph to ascertain clusters that solve a related objective function defined for the participation graph.

2. The computer-implemented method of claim 1, wherein determining clusters by solving the objective function defined for the auxiliary graph comprises applying a minimum-cut algorithm to the auxiliary graph that is constructed.

3. The computer-implemented method of claim 2, wherein applying the minimum-cut algorithm comprises selecting one of the entities of the auxiliary graph as a target and employing the minimum-cut algorithm on the target to obtain a cluster having a set of vertices on a side of the cut that includes the target.

4. The computer-implemented method of claim 1, wherein the entities comprise participants in online auctions and the relationships relate participants when the participants compete in the same auctions.

5. The computer-implemented method of claim 1, further comprising deriving the objective function defined for the auxiliary graph by transforming the related objective function defined for the participation graph.

6. The computer-implemented method of claim 1, wherein the auxiliary graph is configured to be less dense than the participation graph.

7. The computer-implemented method of claim 1, wherein:
    the participation graph is configured to connect the vertices that represent the entities with edges corresponding to relationships between the entities; and
    constructing the auxiliary graph includes transforming the participation graph to the undirected bipartite graph corresponding to the participation graph by introducing the edges between the vertices that represent the entities and additional vertices introduced to represent the relationships between the entities.

8. The computer-implemented method of claim 1, wherein the objective function defined for the auxiliary graph is represented as $f(H)$ and has the form $f(H)=e_{G_b}(H,\overline{H})+g(H)$, where $e_{G_b}(H,\overline{H})$ measures the total weight of the edges removed from the participation graph in constructing the auxiliary graph, and g(H) is a function that penalizes the large clusters, which are represented as H.

9. The computer-implemented method of claim 8, wherein the objective function defined for the participation graph has the form $f(H \cap A)=e_G(H \cap A, \overline{H \cap A})+g(H \cap A)$, wherein $H \cap A$ represents a cluster for the participation graph that has the same set of entities A as a cluster H that is determined to solve the objective function defined for the auxiliary graph.

10. The computer-implemented method of claim 1, wherein constructing the auxiliary graph includes introducing the directed edges and directionally weighting the directed edges such that an edge from an entity to a relationship has a relatively higher weight than an edge from the relationship to the entity.

11. The computer-implemented method of claim 1, wherein the objective function defined for the auxiliary graph is configured to measure a number of edges that are removed to form a cluster and penalize large clusters.

12. One or more computer-readable memories storing instructions that, when executed by one or more server devices, cause the one or more server devices to implement a clustering tool configured to perform operations comprising:
    obtaining an undirected bipartite graph that connects entities to relationships of the entities using undirected edges between vertices that represent the entities and vertices that represent the relationships, the undirected bipartite graph being derived from a participation graph in which edges representing the relationships of the entities connect related entities, one entity to another entity;
    creating a directed graph by replacing the undirected edges in the undirected graph with directed edges, the creating enabling an objective function to be minimized, the objective function measuring a total weight of edges removed from the undirected graph to create the directed graph;
    assigning directional weights to the directed edges;
    constructing an auxiliary bipartite graph from the directed graph by connecting the vertices representing an entity to an arbitrary sink vertex;
    selecting one of the entities as a target; and
    employing a minimum-cut algorithm on the target to obtain a cluster having a set of vertices on a side of the cut that includes the target.

13. One or more computer-readable memories of claim 12, wherein the operations further comprise minimizing the objective function, represented as $f(H)$, and having the form $f(H)=e_G(H,\overline{H})+g(H)$, where g(H) is a function that penalizes large clusters H and $e(H,\overline{H})$ measures the total weight of the edges removed from the undirected graph in creating the directed graph to form a cluster H.

14. One or more computer-readable memories of claim 12, wherein assigning directional weights comprises assigning a relatively higher weight to edges from an entity to a relationship than is assigned to edges from a relationship to an entity.

15. One or more computer-readable memories of claim 12, wherein the operations further comprise utilizing the set of vertices obtained on the target side of the cut to determine a cluster for the auxiliary graph, wherein the cluster that is obtained solves both an objective function defined for the auxiliary bipartite graph and a related objective function defined for the participation graph.

16. A computing system comprising:
    one or more processors; and
    computer readable storage media having one or more modules stored thereon, that, when executed via the one or more processors, cause the computing system to perform acts including:

obtaining a participation graph that includes vertices representing advertisers and edges connecting vertices when advertisers represented by the vertices participate in the same auctions for ad space from a service provider;

constructing an auxiliary graph based on the participation graph, the auxiliary graph being based on the participation graph, the constructing including:

forming an undirected bipartite graph corresponding to the participation graph, the undirected bipartite graph connecting the advertisers to the auctions for ad space from the service provider in which the advertisers have participated using undirected edges between the vertices that represent the advertisers and vertices that represent the auctions;

introducing directed edges to connect the vertices representing advertisers with the vertices representing the auctions in which the advertisers have participated to form a directed graph configured to enable minimization of an objective function defined for the auxiliary graph that measures a total weight of edges removed from the undirected bipartite graph to form the directed graph; and connecting vertices representing the advertisers in the directed graph to an arbitrary sink vertex to form the auxiliary graph;

determining clusters by solving the objective function defined for the auxiliary graph; and translating the clusters determined for the auxiliary graph to clusters corresponding to the participation graph.

17. The computer system of claim 16, wherein the clusters corresponding to the participation graph solve an objective function that is configured to measure a weight of the edges removed to form a cluster and penalize clusters based on size.

18. The computer system of claim 16, wherein the auxiliary graph is constructed to reduce the number of edges used to represent a data set to make the auxiliary graph less dense than the corresponding participation graph used to represent the data set.

19. The computer system of claim 16, wherein the auctions are for advertising space reserved in webpages associated with a search service.

20. The computer system of claim 16, wherein the auctions enable advertisers to compete to place advertisements for presentation to clients in conjunction with resources provided by a service provider to the clients.

* * * * *